United States Patent
LaPoint (10) Patent No.: US 9,068,696 B2
(45) Date of Patent: Jun. 30, 2015

(54) OVERFLOW VALVE PREVENTION SYSTEM

(71) Applicant: G & A Products LLC, West Linn, OR (US)

(72) Inventor: Garry L. LaPoint, Woodburn, OR (US)

(73) Assignee: G & A Products, LLC, West Linn, OR (US)

(*) Notice: Subject to any disclaimer, the term of this patent is extended or adjusted under 35 U.S.C. 154(b) by 290 days.

(21) Appl. No.: 13/655,837

(22) Filed: Oct. 19, 2012

(65) Prior Publication Data

US 2014/0109977 A1    Apr. 24, 2014

(51) Int. Cl.
*B67D 7/32* (2010.01)
*F17D 3/00* (2006.01)
*B65D 90/10* (2006.01)

(52) U.S. Cl.
CPC .............. *F17D 3/00* (2013.01); *Y10T 29/49716* (2015.01); *B65D 90/105* (2013.01); *B67D 7/3209* (2013.01)

(58) Field of Classification Search
CPC ...... B65D 90/105; B67D 7/3209; B67D 7/78; F17D 5/02
USPC .................................................. 137/363, 312
See application file for complete search history.

(56) References Cited

U.S. PATENT DOCUMENTS

| | | | |
|---|---|---|---|
| 1,595,503 A | 8/1926 | Crouse | |
| 4,655,361 A * | 4/1987 | Clover et al. | 137/363 |
| 4,763,806 A | 8/1988 | Podgers et al. | |
| 4,770,317 A | 9/1988 | Podgers et al. | |
| 4,842,443 A | 6/1989 | Argandona | |
| 4,896,705 A | 1/1990 | Podgers et al. | |
| 4,971,225 A | 11/1990 | Bravo | |
| 5,016,689 A | 5/1991 | McGarvey et al. | |
| 5,529,098 A | 6/1996 | Bravo | |
| 5,975,110 A * | 11/1999 | Sharp | 137/234.6 |
| 6,223,765 B1 | 5/2001 | Small et al. | |
| 7,455,194 B2 | 11/2008 | Hutchinson | |

* cited by examiner

*Primary Examiner* — Kevin Murphy
(74) *Attorney, Agent, or Firm* — DeLio, Peterson & Curcio LLC; Peter W. Peterson (57) ABSTRACT

A method of controlling overflow in a below-ground transfer pump sump used in the dispensing of liquid fuels. The method comprises providing a sump having a sump bottom below a level of ground immediately adjacent the sump, providing a storage tank having an internal cavity for the storage of liquid fuel, the storage tank having a conduit in communication with the sump and providing an overflow assembly having an inlet disposed within the sump and an outlet communicating with the conduit. The method includes permitting water from the ground adjacent the sump to enter the sump and mix with any liquid fuel in the sump and if the liquid fuel and water mixture in the sump reaches a predetermined level, allowing the liquid mixture to pass through the overflow assembly, into the conduit and into the storage tank containing the liquid fuel.

14 Claims, 5 Drawing Sheets

OVERFLOW VALVE PREVENTION SYSTEM

BACKGROUND OF THE INVENTION

1. Field of the Invention

The present invention relates to a method and system for preventing the spillage of liquid fuel to the ground adjacent the system sump or manhole.

2. Description of Related Art

Gasoline dispensing stations generally include a large underground holding tank, also called a storage tank, and a pump to transfer gasoline from the holding tank to a vehicle gasoline tank. There are a variety of configurations, but in addition to the holding tank and pump, most include a sump having a cover which is at or near the ground surface. The transfer pump may be a pump/motor combination located in the holding tank or in the sump. Alternately the transfer pump may include the pump in the storage tank and the motor in the sump and driving the pump in the holding tank. In operation the pump forces the gasoline up through a conduit to a location above the level of the ground.

Distinction is made between a pump and a pump/motor combination. A pump is referred to as a device which provides fluid flow and uses an external device for providing the motion to power the pump. The external device may be a motor which provides rotation to the internals of the pump such as in a centrifugal pump, turbine pump or positive displacement pump. A pump/motor combination includes both the pump and motor in the same casing as in a submersible well pump, the motor having a seal for preventing liquid from entering the motor. The term "transfer pump" refers to a pump, whether the motor is directly attached to the pump in the same casing or the motor is located a distance from the pump.

A sump may contain a motor, pump, fill line, gasoline transfer line or venting equipment. A riser assembly extends between the holding tank and the sump and may enclose transfer conduits, a drive shaft, control equipment or any other dispensing equipment. The sump, located below ground level, may be prone to having surface water enter through open portions, unsealed portions and through portions which include an aged seal no longer able to keep the surface water from entering. Surface water can include rain water, overflowing stream, river or bay water, overflowing sewage or storm drain water, liquid soap solution, vehicle coolant, or any other liquid that a vehicle or person can spill. When gasoline is already in the sump from leaks or over filling, the surface water mixes with the gasoline. When the level of fluid is beyond that which the sump can hold, the result is overflowing of the fluid to the adjacent ground, thereby threatening contamination of the adjacent ground or ground water. The gasoline in the overflow causes a hazardous situation in which regulatory agencies must be alerted, generating hefty cleanup fees and fines.

The pressure needed to force the gasoline upward often causes leaks in the distribution equipment including the transfer pump, conduit, sump, dispensing apparatus or any of the connections within these components. The sump generally includes an alarm system to warn an attendant of gasoline or surface water leaking into the sump and causing an overflow condition. However, the delivery systems are so automated and so complicated that the average employee often does not completely understand the different alarm signals. As a result, the employee may view them as a nuisance and all too frequently just turns the alarm off. Whether it is from ignorance or false belief that there is an automated removal system for the gasoline, surface water or any other fluids in the sump, the alarm is often turned off when sounded and nothing is done immediately (or ever) to remedy the mixture of gasoline, surface water or fluids in the sump. Accordingly, there is a need for an automatic sump overflow prevention system and method that affords additional time for fuel station owners and operators to keep problems contained and avoid ground and groundwater contamination and expensive attendant clean-up costs.

SUMMARY OF THE INVENTION

Bearing in mind the problems and deficiencies of the prior art, it is therefore an object of the present invention to provide a system and method of controlling overflow in a below-ground sump.

It is another object of the present invention to provide a method of controlling overflow in a below-ground transfer pump sump used in the dispensing of liquid fuels.

A further object of the invention is to provide a method for preventing contamination of ground adjacent a sump used in the storing and dispensing of liquid fuels.

It is yet another object of the present invention to provide an overflow prevention system for controlling overflow in a below-ground sump used to dispense liquid fuels.

It is still another object of the present invention to provide an overflow prevention system which is adaptable to existing fuel dispensing sumps.

Still other objects and advantages of the invention will in part be obvious and will in part be apparent from the specification.

The above and other objects, which will be apparent to those skilled in the art, are achieved in the present invention which is directed to a method of controlling overflow in a below-ground transfer pump sump used in the dispensing of liquid fuels. The method comprises providing a sump having a sump bottom below a level of ground immediately adjacent the sump, providing a storage tank having an internal cavity for the storage of liquid fuel, the storage tank having a conduit in communication with the sump and providing an overflow assembly having an inlet disposed within the sump and an outlet communicating with the conduit. The method includes permitting water from the ground adjacent the sump to enter the sump and mix with any liquid fuel in the sump and if the liquid fuel and water mixture in the sump reaches a predetermined level, allowing the liquid mixture to pass through the overflow assembly, into the conduit and into the storage tank containing the liquid fuel.

The method may include the step of allowing the water to separate from the liquid fuel in the storage tank and to sink to the bottom of the storage tank after allowing the liquid to pass into the storage tank containing the liquid fuel.

The method may include the step of removing the separated water from the bottom of the storage tank.

The overflow assembly may include a flow control ball and seal, the ball engaging the seal in a biased position and upon the level of liquid mixture reaching a sufficient level to urge the ball from the biased position, allowing the flow of fluid through the overflow assembly and into the storage tank. A spring adjacent the flow control ball biases the flow control ball against the seal.

The overflow assembly may include a flow control float and valve plate, the valve plate preventing the flow of the liquid mixture through the overflow assembly when the valve plate is in a biased position and upon the level of the liquid mixture reaching a sufficient level to urge the float in an upward direction, allowing the flow of the liquid mixture through the overflow assembly and into the storage tank.

The pump may be disposed in the internal cavity of the storage tank with a pump outlet pipe extending from the pump to the sump and at least a portion of the pump outlet pipe passing through the conduit.

The outlet of the valve assembly may be in communication with an opening in a sidewall of the conduit. The method may include providing a seal between the valve outlet and the opening of the conduit and further include providing a tensionable clamp which applies sufficient pressure to the valve outlet against the pipe to allow the seal to prevent fluids from leaking from the conduit into the sump.

Another aspect of the present invention is directed to a method of controlling overflow in a below-ground transfer pump sump used in the dispensing of liquid fuels. The method comprises providing a sump having a sump bottom below a level of ground immediately adjacent the sump and providing a storage tank having an internal cavity for the storage of liquid fuel and at least one transfer pump within the storage tank, the storage tank having a conduit in communication with the sump. The method includes providing a riser assembly extending from the storage tank to the sump and providing a valve having an inlet disposed within the sump and an outlet communicating with the riser assembly. The method includes permitting water from the ground adjacent the sump to enter the sump, detecting the level of liquid in the sump including any water and if the liquid reaches a predetermined level, allowing the liquid to pass through the valve, into the riser assembly and into the storage tank containing the liquid fuel.

Another aspect of the present invention is directed to an overflow prevention system in a below-ground transfer pump sump used to dispense liquid fuels. The system comprises a sump having a sump bottom below a level of ground immediately adjacent the sump, and a storage tank having an internal cavity for the storage of liquid fuel and at least one transfer pump within the storage tank, the storage tank having a conduit in communication with the sump and a riser assembly extending from the storage tank to the sump. The system includes a valve having an inlet disposed within the sump and an outlet communicating with the riser assembly. Water from the ground adjacent the sump is allowed to pass into the sump combining with any fuel in the sump. When the water and fuel liquids reach a predetermined level in the sump, the liquids are allowed to pass through the valve, into the riser assembly and into the storage tank containing the liquid fuel.

Another aspect of the present invention is directed to an apparatus for controlling overflow in a below-ground transfer pump sump used in the dispensing of liquid fuels. The apparatus comprises an overflow assembly sealingly attachable with a riser assembly disposed within a sump having a sump bottom below a level of ground immediately adjacent the sump. The riser assembly extends from the sump to a storage tank below the sump and has an internal cavity for the storage of liquid fuel. The overflow assembly comprises a valve body having opposing ends and is disposed within the sump. The valve body includes a flow control which allows fluids to pass through the valve body when the valve body is in an open position. The apparatus includes a valve inlet disposed on one end of the valve body and positioned within the sump and a valve outlet disposed on the opposite end of the valve body. The valve outlet is in communication with the riser assembly within the sump. The riser assembly comprises a vertical cylindrical pipe extending from the sump to the cavity of the storage tank and includes an opening on the cylindrical pipe. The apparatus includes a seal disposed between the valve outlet and riser assembly opening and an adjustable clamp engageable with the valve outlet and the riser assembly wherein the valve outlet is sealed against the riser assembly opening. Water from the ground adjacent the sump entering the sump mixes with any liquid fuel in the sump and if the liquid fuel and water mixture in the sump reaches a predetermined level, the liquid mixture passes through the overflow assembly, into the conduit and into the storage tank containing the liquid fuel.

The valve body may include a flow control ball and seal, the ball engaging the seal in a biased position and upon the level of liquid mixture reaching a sufficient level to urge the ball from the biased position, allows the flow of fluid into the valve inlet, through the valve body and valve outlet and into the storage tank. A spring adjacent the flow control ball biases the flow control ball against the seal.

The valve body may alternately include a flow control float and valve plate, the valve plate preventing of the flow of the liquid mixture through the overflow assembly when the valve plate is in a biased position. Upon the level of the liquid mixture reaching a sufficient level to urge the float in an upward direction, the flow of the liquid mixture is allowed through the overflow assembly and into the storage tank.

Another aspect of the present invention is directed to a method for retrofitting an overflow valve assembly in a below-ground transfer pump sump used in the dispensing of liquid fuels. The method comprises providing a sump in communication with a liquid fuel storage tank and a riser assembly extending between the sump and the storage tank, the riser assembly comprising a conduit having a cylindrical side wall. The method includes providing an overflow assembly comprising an overflow valve, an overflow inlet attached to one end of the overflow valve and an overflow outlet attached to the opposite end of the overflow valve. The overflow assembly includes a mounting plate having a plate opening in communication with the overflow outlet and at least one clamp for attaching the mounting plate to the sidewall of the riser assembly. The method includes generating an opening in the sidewall of the riser assembly, placing the overflow outlet of the overflow assembly adjacent the opening of the riser assembly and securing the mounting plate to the riser assembly with the at least one clamp.

The overflow outlet may include a flange attached thereto and the overflow assembly may include a gasket for placement between the overflow outlet flange and the riser assembly. The method may include placing the gasket between the flange and the riser assembly opening prior to the step of placing the overflow outlet of the overflow assembly adjacent the opening of the riser assembly.

The mounting plate may be integral with the overflow outlet. The overflow outlet may include a flange and the method may include inserting the overflow assembly through the mounting plate opening prior to the step of placing the overflow outlet of the overflow assembly adjacent the opening of the riser assembly, whereby the flange is disposed adjacent the riser assembly opening.

The overflow assembly may include a gasket placed between the flange and the riser assembly opening prior to the step of placing the overflow outlet of the overflow assembly adjacent the opening of the riser assembly.

The method may include after the step of securing the mounting plate to the riser assembly with the at least one clamp, permitting water from the ground adjacent the sump to enter the sump and mix with any liquid fuel in the sump. If the liquid fuel and water mixture in the sump reaches a predetermined level, the liquid mixture is allowed to pass through the overflow assembly, into the conduit and into the storage tank containing the liquid fuel. The at least one clamp may be integral with the mounting plate.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-12 of the drawings in which like numerals refer to like features of the invention.

The present invention is a system which provides an alternative to a liquid fuel storage and delivery system which has the potential of contaminating the ground adjacent to a sump within the system. Liquid fuels include by way of example gasoline and diesel fuel, or other liquid hydrocarbons or substitute hydrocarbons. The method and apparatus provided is in opposition to conventional and accepted practice wherein the contamination of liquid fuel by the addition of surface water is avoided. In contrast, the present invention provides intentional contamination of the gasoline in the holding tank when a sufficient amount of surface water enters the sump. Although the method includes the mixing of surface water with liquid fuel in the holding tank, the cost for cleanup of gasoline in the sump which is allowed to overflow into the ground adjacent the sump far exceeds the cost to remove the surface water from the holding tank. This is particularly true since gasoline is less dense than water and the method includes allowing the water to sink to the bottom of the storage tank, making the removal of water from the storage tank easier than cleanup of the liquid fuel from the adjacent ground.

Figure 1:
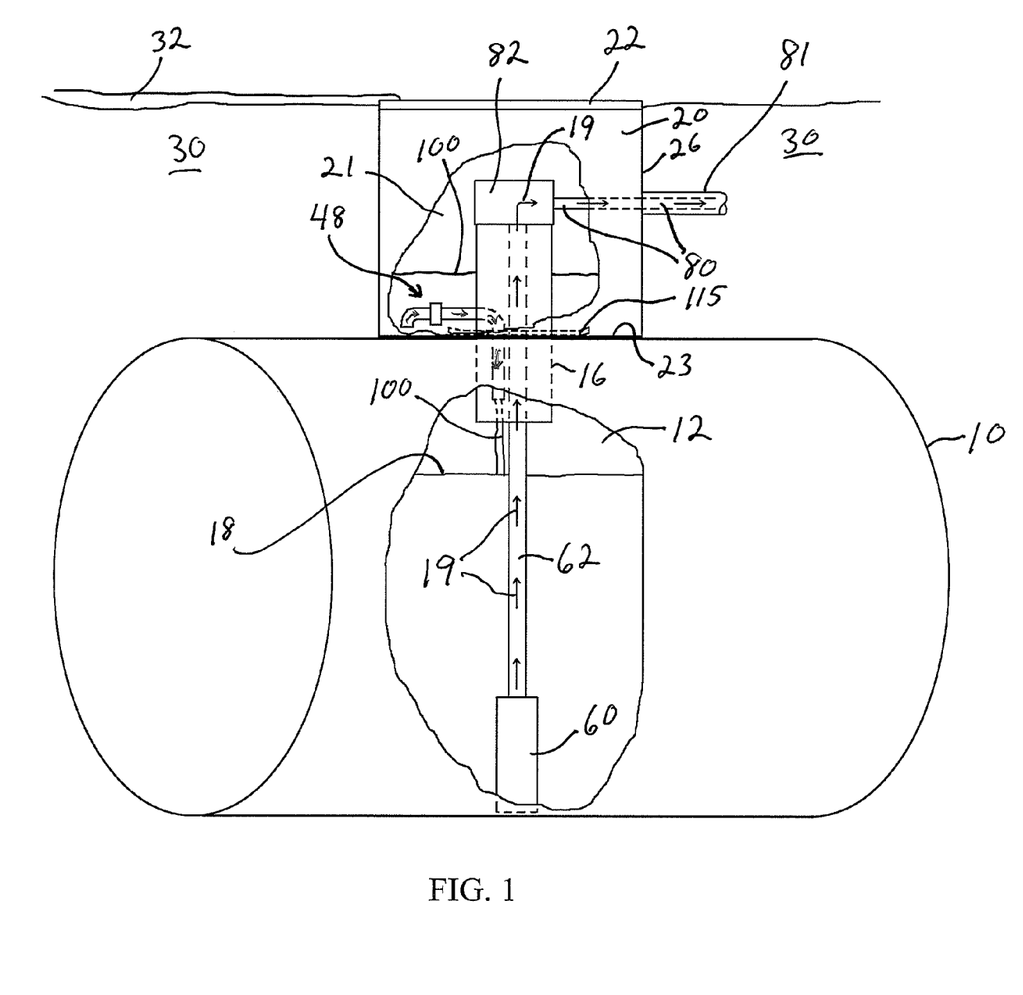
FIG. 1 is a cutaway view of a system used for controlling overflow according to the present invention.
Figure 2:
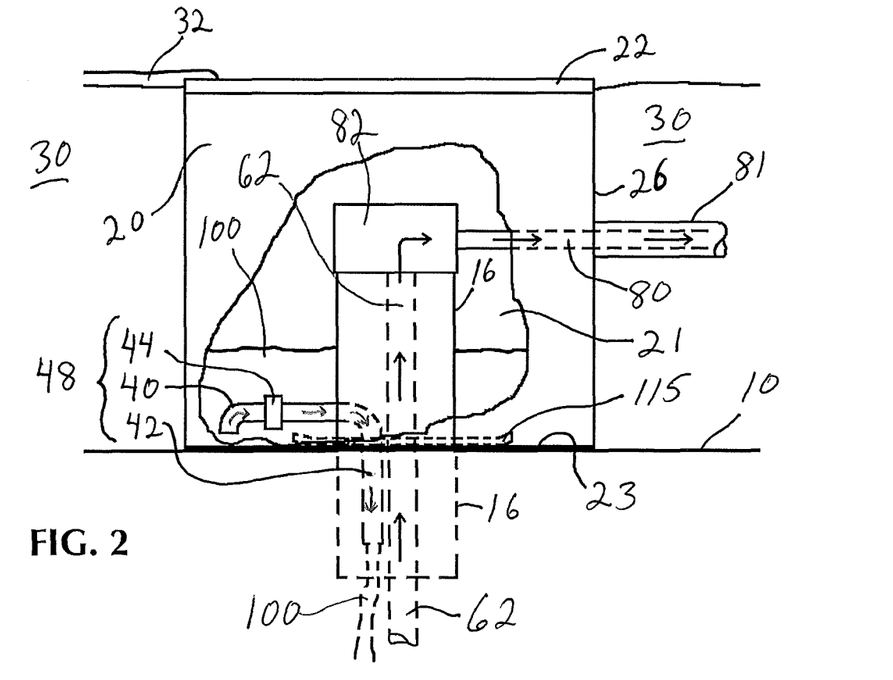
FIG. 2 is an enlarged cutaway view of a portion of the system shown in FIG. 1.

A fuel dispensing system including the overflow valve according to the present invention is shown in FIG. 1. The fuel dispensing system includes a storage tank 10 having a storage tank cavity 12 which stores a liquid fuel 18. The system includes a manhole or sump 20 positioned above the storage tank 10. An overflow valve assembly 48 located inside the sump 20 includes an overflow inlet 40, overflow outlet 42 and an overflow valve 44 (FIG. 2).

A combination pump/motor 60 may be disposed at or near the bottom of the storage tank 10. In operation, the pump/motor 60 forces the liquid fuel 18 up through a pump outlet pipe 62 which extends from the pump/motor 60, and through a riser assembly 16 which extends through a top portion of the storage tank 10 and into the sump 20. The riser assembly 16 may be a conduit extending between the cavity 12 of the storage tank 10 and the sump 20. A portion of the pump outlet pipe 62 extends through the riser assembly 16.

The apparatus shown by way of example may include the holding tank or storage tank 10, a sump 20 in communication with the storage tank and a riser assembly 16 extending between the storage tank and the sump. The sump 20 may include a sump cover 22 which is located at or near the level of the ground 30 such that when surface water 32 is on the surface of the ground 30 adjacent the sump 20, the surface water 32 is allowed to perforate the sump cover 22 or a top portion of the sump 20 and flow into the sump 20. The riser assembly 16 may extend from the storage tank 10 to the sump 20 and may contain a portion of the pump outlet pipe 62 to allow the liquid fuel 18 to be pumped from the storage tank 10, through the pump outlet pipe 62 to an outlet manifold 82 and outlet tube 80 where the liquid fuel 18 flows to a dispensing system or a secondary containment line.

The sump 20 includes a sump bottom 23 and may be positioned above the storage tank. The sump 20 is in communication with the storage tank though the riser assembly 16 and riser mounting plate 115. The riser mounting plate 115 allows the riser assembly to be sealed as it passes through the sump bottom 23 and an upper portion of the storage tank 10. A riser mounting plate 115 may be disposed above and seal against the sump bottom 23. An outlet manifold 82 may be located within the sump 20 and receive the liquid fuel 18 which is pumped from the storage tank cavity 12, through the pump outlet pipe 62 and into the outlet manifold 82. The outlet manifold 82 may include an outlet tube 80 which is connected to dispensing pumps (not shown) located above the ground 30. A secondary containment conduit 81 may be sealingly attached to the sump 20 and extends outwardly from the sump wall 26 to contain any leaks in the outlet tube within the containment conduit 81. The containment conduit may be attached to the sump with a gasket, fiberglass, welding or the like. The containment conduit 81 may be sloped downwardly toward the sump so that any fluids within the containment conduit 81 may drain back into the sump 20. Arrows 19 show the direction of pressurizes fuel flow from the pump/motor 60 to the outlet tube 80. When there is more than one dispensing system, e.g., multiple dispensing pump islands, one or more outlet tubes extend to each system. The outlet tube 80 within the containment conduit 81 presents a possible failure point and point of entry of gasoline back to the sump.

The overflow prevention apparatus may include an overflow assembly 48 with the overflow valve inlet 40 in communication with the sump cavity 21 and the overflow valve outlet 42 in communication with and extending through the riser assembly 16. Alternately, the overflow assembly 48 may have a separate pathway from the sump cavity 21 to the holding tank 10 without passing through the riser assembly 16, but the riser assembly 16 provides an existing passageway which extends from the sump 20 to the storage tank 10. Within the sump 20, the overflow valve inlet 40 communicates with the overflow outlet 42 through the overflow valve 44. The overflow valve 44 opens and closes in response to a level of liquid 100 in the sump 20.

FIG. 2 shows a portion of the overflow valve system including the overflow assembly 48. The sump 20 may contain a surface water/fuel mixture 100 which reaches a level sufficient to activate the overflow valve 44. When activated, the overflow valve 44 opens, allowing the surface water/fuel mixture 100 to flow into the overflow inlet 40, through the overflow valve 44 and through the overflow outlet 42. The mixture 100 flows downward by gravity through the riser assembly 16 and into the cavity 12 of the storage tank. The overflow outlet 42 may be disposed inside the riser assembly 16 and external to the pump outlet pipe 62. The overflow outlet 42 may alternately extend below the bottom of the riser assembly 16.

Figure 3:
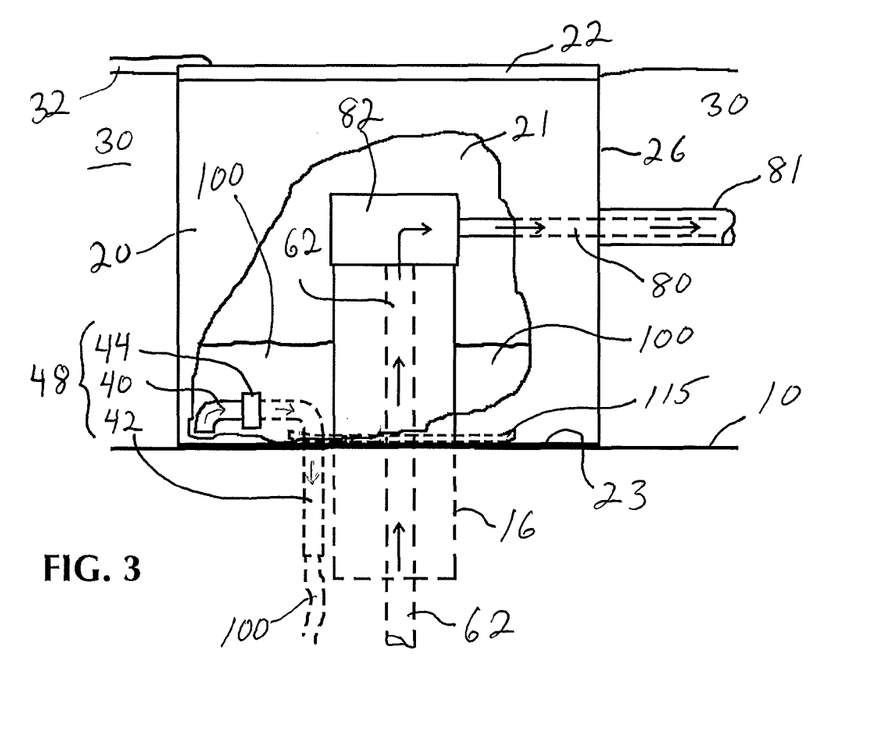
FIG. 3 is an enlarged cutaway view of a portion of an alternate embodiment of the system shown in FIG. 2.

In an alternate embodiment of the overflow prevention system shown in FIG. 3, the overflow valve outlet 42 may be disposed external to the riser assembly 16 and extend through the sump bottom 23 and into the storage tank cavity 12. The overflow valve outlet 42 may pass through the riser mounting plate 115 or alternately may be positioned away from the riser mounting plate 115.

Figure 4:
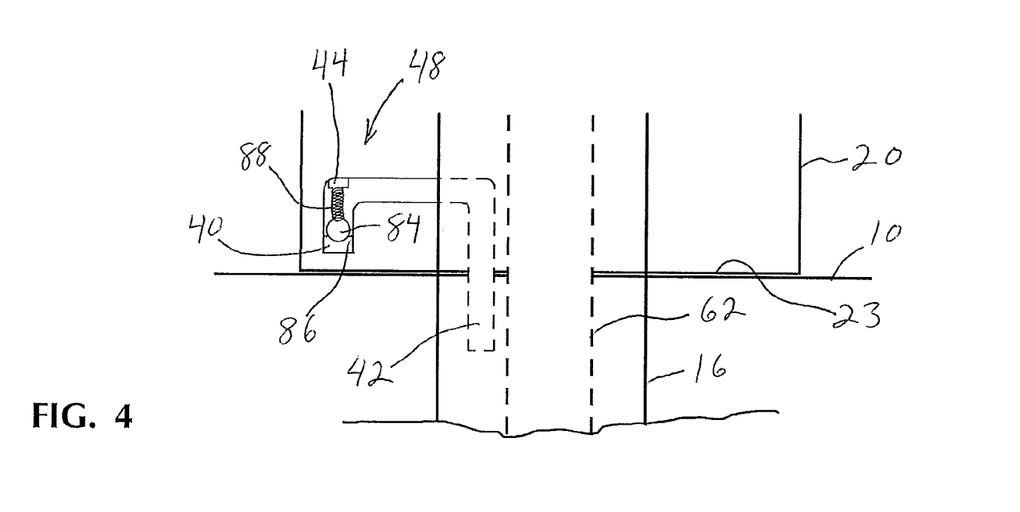
FIG. 4 is a cross sectional view of a valve assembly of the system shown in FIG. 1.

The overflow valve 44 may sense and respond to liquid levels within the sump 20. As shown in FIG. 4, the assembly includes an overflow valve inlet 40, overflow valve outlet 42 and an overflow float valve comprising a flow control ball 84, flow control seal 86 and a flow control spring 88. The overflow valve 44, overflow valve inlet 40 are positioned within the sump 20 and the overflow valve outlet 42 extends from the sump 20 to a location within the riser assembly 16. In the closed position, the ball 84 is biased against the seal 86 by the spring 88. The ball 84 is less dense than the mixture 100 so when the sump liquid mixture 100 reaches a level above the biased position of the ball 84, the ball 84 is urged in an upward direction away from the seal 86 (open position of FIG. 5) and allows the mixture 100 to flow through the overflow assembly 46 and into the storage tank cavity 12. The sump liquid mixture 100 is then allowed into the overflow inlet, past the ball 84 and the seal 86, through the overflow outlet 42 and downward through the riser assembly and into the cavity 12 of the storage tank 10. The overflow valve 44 may be located below most or all of the potential failure points within or attached to the sump 21.

In operation, the ball 84 engages the seal 86 in a biased position and upon the level of liquid mixture 100 reaching a sufficient level to urge the ball 84 from the biased position, the mixture 100 flows through the overflow assembly and into the storage tank. The spring 88 adjacent the flow control ball 84 biases the flow control ball 84 against the seal 86.

Figure 5:
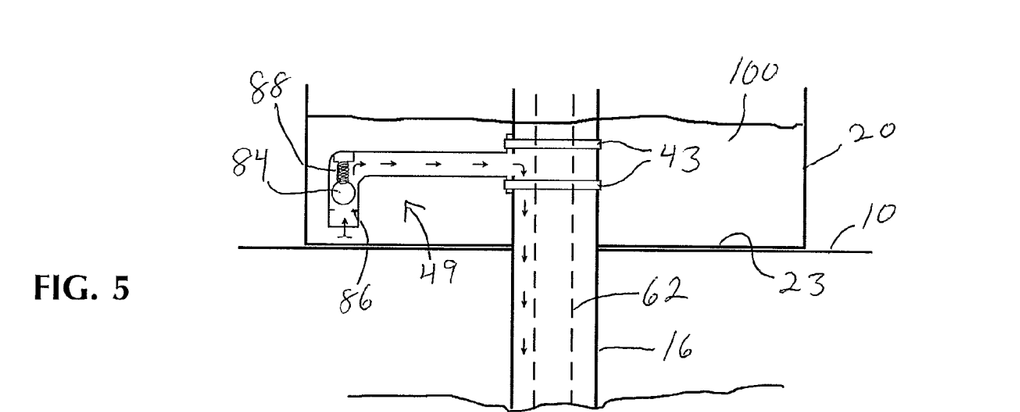
FIG. 5 is a cross sectional view of another embodiment of the valve assembly retrofit onto the riser assembly according to the present invention.
Figure 6:
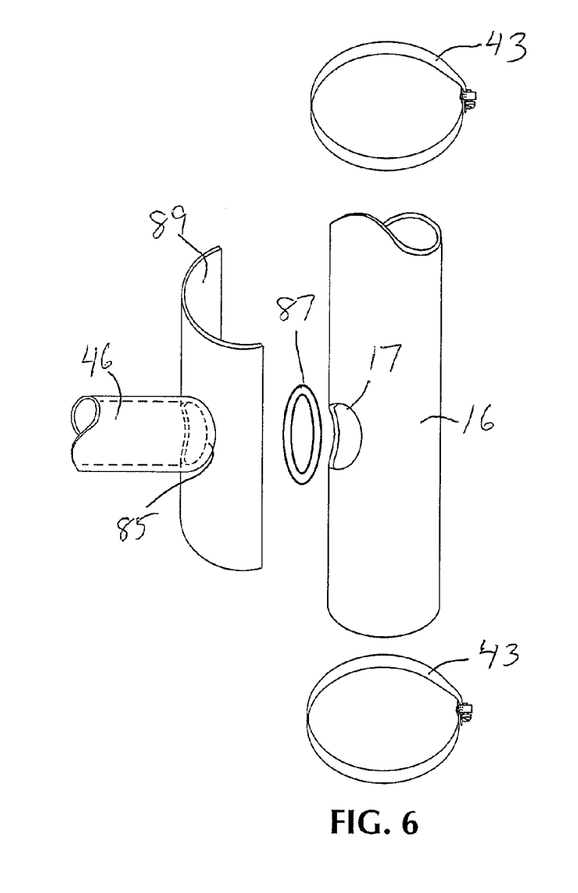
FIG. 6 is an exploded view of the valve outlet and riser assembly in FIG. 5.
Figure 7:
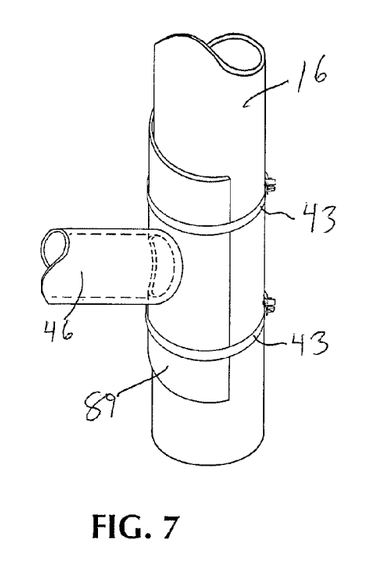
FIG. 7 is an assembled perspective view of the valve outlet and riser assembly in FIG. 5.

FIG. 5 shows a second embodiment of the overflow valve assembly 49 attached to the riser assembly 16 and disposed within the sump 20. FIGS. 6 and 7 show a portion of the valve assembly 49 attachable to the riser assembly 16 in an exploded view and an assembled view respectively. The valve assembly 49 may include an overflow valve inlet 40, overflow valve 44, integrated valve outlet 46 and a mounting plate 89 sealingly attached to the riser assembly 16 with a pair of clamps 43. As shown in the exploded view of FIG. 6, the valve assembly 49 includes a gasket 87 for sealing the valve assembly 49 against a riser assembly sidewall opening 17 whereby fluids may flow from the integrated outlet, through a mounting plate opening 85 and into the riser assembly sidewall opening 17.

Figure 8:
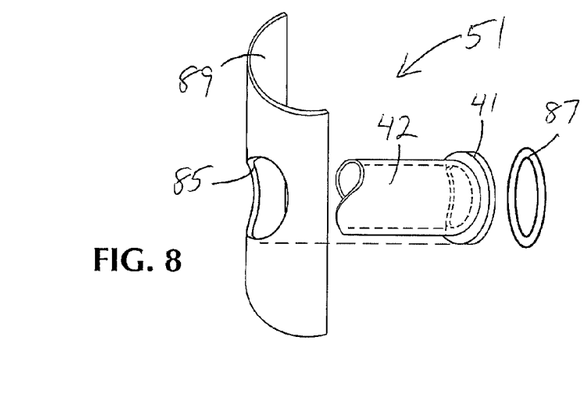
FIG. 8 is an exploded view of a second embodiment of the valve outlet and riser assembly according to the present invention.

In another embodiment of the valve assembly 51 shown in FIG. 8, the valve outlet 42 engageable with mounting plate opening 85 and includes an outlet flange 41 to seal the valve outlet 42 against the riser assembly 16 with the gasket 87. A pair of adjustable band clamps 59 engages the mounting plate 89 and gasket 87 seals the valve assembly 51 with the riser assembly sidewall opening 17.

Figure 9:
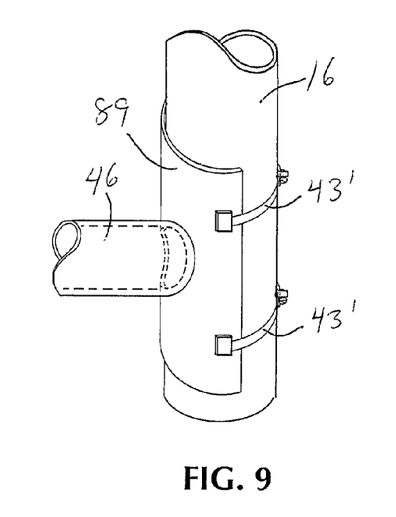
FIG. 9 is a perspective view of a third embodiment of the valve outlet and riser assembly.

FIG. 9 shows a second embodiment of the mounting plate 89' which includes integrated clamps 43' permanently attached to the mounting plate 89'.

Figure 10:
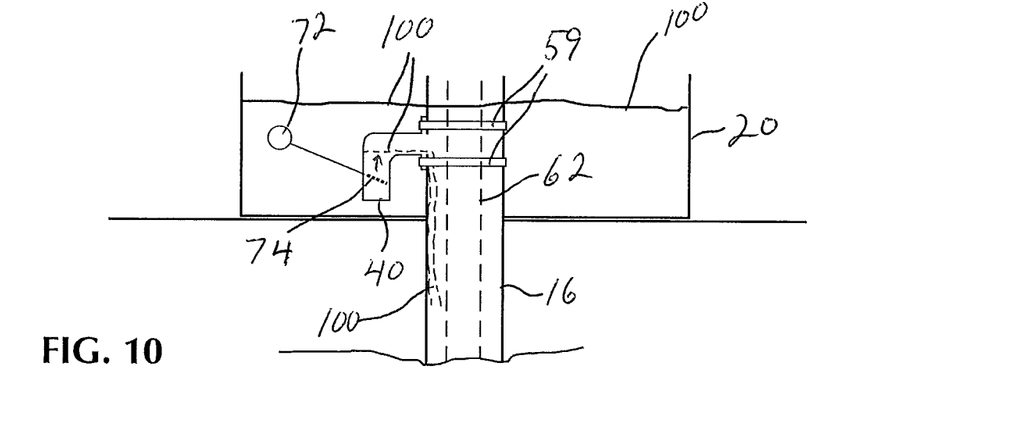
FIG. 10 is a cross sectional view of a second embodiment of a valve assembly used in transferring liquids from an underground sump to a holding tank below the sump, the valve shown in the closed position.
Figure 11:
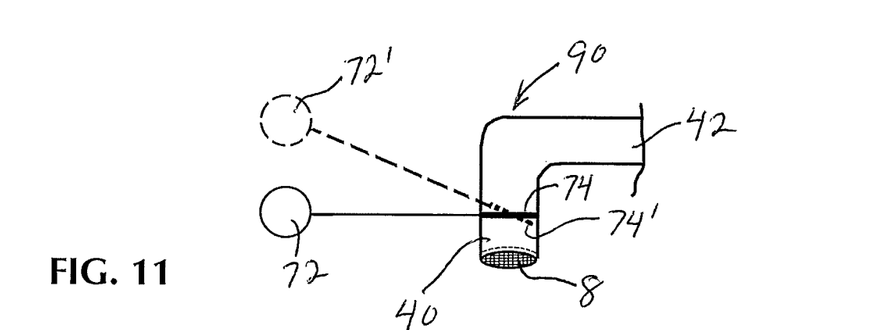
FIG. 11 is a cross sectional view of the valve assembly of FIG. 7 shown in the closed position and the open position in phantom lines.

FIGS. 10 and 11 show a second embodiment of an overflow assembly. The closed position of a float 72 positions a butterfly valve or valve plate 74 to prevent flow of the mixture 100 through float valve assembly 90. When the mixture 100 level pushes the float 72' to an open position, the butterfly valve 74' swings to an open position allowing the mixture to flow from the overflow inlet 40 to the overflow outlet 42. The mixture 100 then flows downward by gravity into the cavity of the storage tank 10. The overflow valve inlet 40 may include a filter or screen 8 to prevent particles or debris from entering the inlet 40 and fouling the overflow valve assembly 90. The screen 8 may be used in the overflow valve inlet 40 in any of the above embodiments of the overflow valve assembly 40.

The overflow assembly 90 may include the flow control float 72 and valve plate 74, the valve plate preventing of the flow of liquid mixture 100 through the overflow assembly 90 when the valve plate 74 is in a biased position and upon the level of liquid mixture 100 reaching a sufficient level to urge the float 72 in an upward direction, allowing the flow of the liquid mixture 100 through the overflow assembly 90 and into the storage tank 10.

Figure 12:
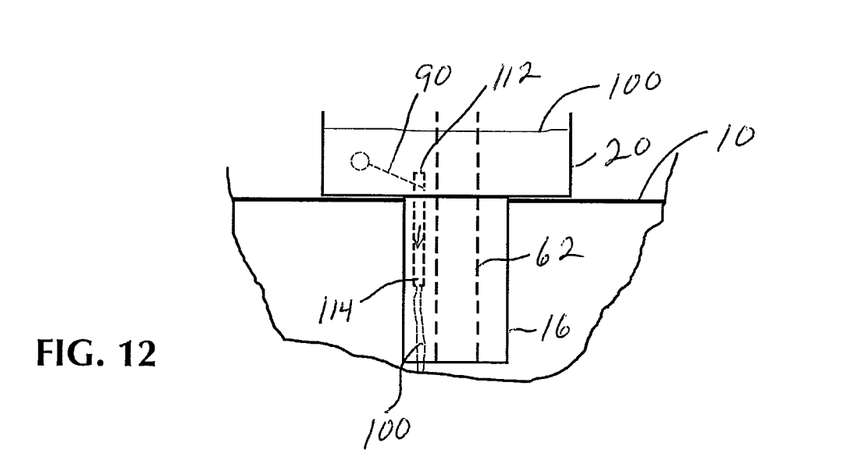
FIG. 12 is a cutaway view of a third embodiment of a valve assembly used in transferring liquids from an underground sump to a holding tank below the sump.

In another embodiment of the overflow valve assembly shown in FIG. 12, the overflow assembly may include an upwardly facing inlet opening 112 in the sump and a downwardly facing opening 114 in the riser assembly. The overflow valve disposed between the opening 112 and opening 114 may be a float valve assembly 90 whereby a liquid mixture 100 in the sump reaching the upwardly facing inlet opening 112, enters the upwardly facing inlet opening 112, and upon the liquid reaching a level sufficient to urge the float 72 upward, flows through the butterfly valve 74 and flows by gravity through the downwardly facing opening and into the cavity 12 of the storage tank 10.

A method of controlling overflow in a below-ground transfer pump sump may include providing a sump 10 having a sump bottom below a level of ground immediately adjacent the sump and at least one transfer pump within the sump and a storage tank having an internal cavity for the storage of liquid fuel. The storage tank includes a conduit in communication with the transfer pump. The method also includes providing a riser assembly pipe extending from the storage tank to the sump, a valve having an inlet disposed within the sump and an outlet communicating with the riser assembly pipe. The method may include permitting water from the ground adjacent the sump to enter the sump, detecting the level of liquid in the sump including any water; and if the liquid reaches a predetermined level, allowing the liquid to pass through the valve, into the riser assembly and into the storage tank containing the liquid fuel.

The method may include allowing the surface water 32 to separate from the liquid fuel 18 in the storage tank and to sink to the bottom of the storage tank after allowing the liquid to pass into the storage tank containing the liquid fuel. The surface water 32 at the bottom of the storage tank 10 may then be removed by drawing the water out of the storage tank 10 or by allowing the water 32 to flow out of a port in the bottom side of the storage tank 10 to a specified location.

A method for retrofitting an overflow valve assembly in a below-ground transfer pump sump used in the dispensing of liquid fuels may include providing a sump in communication with a liquid fuel storage tank and a riser assembly extending between the sump and the storage tank, the riser assembly comprising a conduit having a cylindrical side wall. The method also may include providing an overflow assembly as described in any one of the embodiments above. The overflow assembly includes a mounting plate having a plate opening in communication with the overflow outlet and a pair of clamps for attaching the mounting plate to the sidewall of the riser assembly.

The method includes generating an opening in the sidewall of the riser assembly by boring, grinding, drilling, punching or a combination thereof. The overflow outlet of the overflow assembly is positioned adjacent the opening of the riser assembly and the mounting plate is secured to the riser assembly with the at least one clamp. The overflow outlet 42 is integral with the mounting plate 89 or alternately the overflow outlet 42 includes a flange 41 attached to the overflow outlet 42 assembly and the mounting plate includes an opening 85 to engage the overflow assembly and urge the flange against the riser assembly opening 17. A gasket 87 is placed between the mounting plate 89 and the riser assembly opening 17 or between the flange 41 and the riser assembly opening 17.

An additional redundant alarm may be added to any of the embodiments above, such as an alarm which initiates a land line or cell phone call to the owner upon activation of the alarm. Other notifications may also be made to an owner's smartphone or other computer system.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of controlling overflow in a below-ground transfer pump sump used in the dispensing of liquid fuels, the method comprising:
   providing a sump having a sump bottom below a level of ground immediately adjacent the sump;
   providing a storage tank having an internal cavity for the storage of liquid fuel, the storage tank having a conduit in communication with the sump;
   providing an overflow assembly having an inlet disposed within the sump and an outlet communicating with the conduit;
   permitting water from the ground adjacent the sump to enter the sump and mix with any liquid fuel in the sump; and
   if the liquid fuel and water mixture in the sump reaches a predetermined level, allowing the liquid mixture to pass through the overflow assembly, into the conduit and into the storage tank containing the liquid fuel.

2. The method of claim 1 including the step of allowing the water to separate from the liquid fuel in the storage tank and to sink to the bottom of the storage tank after allowing the liquid to pass into the storage tank containing the liquid fuel.

3. The method of claim 1 including the step of removing the separated water from the bottom of the storage tank.

4. The method of claim 1 wherein the overflow assembly includes a flow control ball and seal, the ball engaging the seal in a biased position and upon the level of liquid mixture reaching a sufficient level to urge the ball from the biased position, allowing the flow of fluid through the overflow assembly and into the storage tank.

5. The method of claim 4 wherein a spring adjacent the flow control ball biases the flow control ball against the seal.

6. The method of claim 1 wherein the overflow assembly includes a flow control float and valve plate, the valve plate preventing of the flow of the liquid mixture through the overflow assembly when the valve plate is in a biased position and upon the level of the liquid mixture reaching a sufficient level to urge the float in an upward direction, allowing the flow of the liquid mixture through the overflow assembly and into the storage tank.

7. The method of claim 1 wherein a pump is disposed in the internal cavity of the storage tank and a pump outlet pipe extends from the pump to the sump and at least a portion of the pump outlet pipe passes through the conduit.

8. The method of claim 7 wherein the outlet of the overflow assembly is in communication with an opening in a sidewall of the conduit and wherein the method includes providing a seal between the outlet and the opening of the conduit and further includes providing a tensionable clamp which applies sufficient pressure to the outlet against the pipe to allow the seal to prevent fluids and vapors from leaking from the conduit into the sump.

9. A method of controlling overflow in a below-ground transfer pump sump used in the dispensing of liquid fuels, the method comprising:
   providing a sump having a sump bottom below a level of ground immediately adjacent the sump;
   providing a storage tank having an internal cavity for the storage of liquid fuel and at least one transfer pump within the storage tank, the storage tank having a conduit in communication with the sump;
   providing a riser assembly extending from the storage tank to the sump;
   providing a valve having an inlet disposed within the sump and an outlet communicating with the riser assembly;
   permitting water from the ground adjacent the sump to enter the sump;
   detecting the level of liquid in the sump including any water; and
   if the liquid reaches a predetermined level, allowing the liquid to pass through the valve, into the riser assembly and into the storage tank containing the liquid fuel.

10. An overflow prevention system in a below-ground transfer pump sump used to dispense liquid fuels, the system comprising:
    a sump having a sump bottom below a level of ground immediately adjacent the sump;
    a storage tank having an internal cavity for the storage of liquid fuel and at least one transfer pump within the storage tank, the storage tank having a conduit in communication with the sump;
    a riser assembly extending from the storage tank to the sump; and
    a valve having an inlet disposed within the sump and an outlet communicating with the riser assembly;
    wherein water from the ground adjacent the sump is allowed to pass into the sump combining with any fuel in the sump; and when the water and fuel liquids reach a predetermined level in the sump, the liquids are allowed to pass through the valve, into the riser assembly and into the storage tank containing the liquid fuel.

11. An apparatus for controlling overflow in a below-ground transfer pump sump used in the dispensing of liquid fuels, the apparatus comprising:

an overflow assembly sealingly attachable with a riser assembly disposed within a sump having a sump bottom below a level of ground immediately adjacent the sump, the riser assembly extending from the sump to a storage tank below the sump, the storage tank having an internal cavity for the storage of liquid fuel, the overflow assembly comprising:

a valve body having opposing ends, the valve body disposed within the sump, the valve body having a flow control which allows fluids to pass through the valve body when the valve body is in an open position;

a valve inlet disposed on one end of the valve body and positioned within the sump;

a valve outlet disposed on the opposite end of the valve body, the valve outlet in communication with the riser assembly within the sump, the riser assembly comprising a vertical cylindrical pipe extending from the sump to the cavity of the storage tank, the riser assembly including an opening on the cylindrical pipe;

a seal disposed between the valve outlet and riser assembly opening;

an adjustable clamp engageable with the valve outlet and the riser assembly wherein the valve outlet is sealed against the riser assembly opening;

wherein water from the ground adjacent the sump entering the sump mixes with any liquid fuel in the sump and if the liquid fuel and water mixture in the sump reaches a predetermined level, the liquid mixture to passes through the overflow assembly, into the conduit and into the storage tank containing the liquid fuel.

12. The apparatus of claim 11 wherein the valve body includes a flow control ball and seal, the ball engaging the seal in a biased position and upon the level of liquid mixture reaching a sufficient level to urge the ball from the biased position, allowing the flow of fluid into the valve inlet, through the valve body and valve outlet and into the storage tank.

13. The apparatus of claim 12 wherein a spring adjacent the flow control ball biases the flow control ball against the seal.

14. The apparatus of claim 11 wherein the valve body includes a flow control float and valve plate, the valve plate preventing the flow of the liquid mixture through the overflow assembly when the valve plate is in a biased position and upon the level of the liquid mixture reaching a sufficient level to urge the float in an upward direction, the flow of the liquid mixture is allowed through the overflow assembly and into the storage tank.

* * * * *